United States Patent
Yoneya et al.

(10) Patent No.: US 11,143,122 B2
(45) Date of Patent: Oct. 12, 2021

(54) CONTROL OF AN INTERNAL COMBUSTION ENGINE IN TRANSIENT OPERATING MODE

(71) Applicant: Hitachi Automotive Systems, Ltd., Hitachinaka (JP)

(72) Inventors: Naoki Yoneya, Tokyo (JP); Takashi Okamoto, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/761,903

(22) PCT Filed: Jan. 24, 2019

(86) PCT No.: PCT/JP2019/002366
§ 371 (c)(1),
(2) Date: May 6, 2020

(87) PCT Pub. No.: WO2019/146727
PCT Pub. Date: Aug. 1, 2019

(65) Prior Publication Data
US 2021/0172394 A1  Jun. 10, 2021

(30) Foreign Application Priority Data

Jan. 25, 2018  (DE) .................... 102018201150.8

(51) Int. Cl.
*F02D 41/40*  (2006.01)
*F02D 41/00*  (2006.01)
(Continued)

(52) U.S. Cl.
CPC ..... *F02D 41/0025* (2013.01); *F02D 13/0234* (2013.01); *F02D 41/04* (2013.01); *F02B 47/02* (2013.01)

(58) Field of Classification Search
CPC .. F02D 41/0025; F02D 41/04; F02D 13/0234; F02B 47/02
(Continued)

(56) References Cited

U.S. PATENT DOCUMENTS 6,460,491 B1 * 10/2002 Stanglmaier ....... F02M 25/0228
                                                         123/25 J
6,637,381 B2 * 10/2003 Stanglmaier ........... F02M 25/03
                                                         123/25 F
(Continued)

FOREIGN PATENT DOCUMENTS

JP    S58-128457 A    8/1983
JP    H05-164003 A    6/1993
(Continued)

OTHER PUBLICATIONS

International Search Report and Written Opinion issued in corresponding application No. PCT/JP2019/002366 dated Feb. 26, 2019.
(Continued)

*Primary Examiner* — Hai H Huynh
(74) *Attorney, Agent, or Firm* — Foley & Lardner LLP

(57) ABSTRACT

The present invention provides a method for avoiding knocking in an internal combustions engine, preferably in a gasoline engine with a high compression ratio and a variable valve train which is able to perform EIVC, by injecting a non-combustible fluid into the intake port and/or in the cylinder during a transient operating mode.

15 Claims, 10 Drawing Sheets

(51) Int. Cl.
*F02D 41/04* (2006.01)
*F02D 13/02* (2006.01)
*F02B 47/02* (2006.01)

(58) Field of Classification Search
USPC .......................... 123/25 C, 25 J, 531, 198 A
See application file for complete search history.

(56) References Cited

U.S. PATENT DOCUMENTS

| | | | | |
|---|---|---|---|---|
| 6,637,382 | B1* | 10/2003 | Brehob | F02D 41/005 |
| | | | | 123/25 J |
| 8,347,852 | B2* | 1/2013 | Glugla | F02D 35/027 |
| | | | | 123/305 |
| 8,554,445 | B2* | 10/2013 | Leone | F02P 5/1527 |
| | | | | 701/103 |
| 9,957,921 | B2* | 5/2018 | Leone | F02D 19/12 |
| 10,059,325 | B2* | 8/2018 | Leone | F02D 41/0025 |
| 10,196,067 | B2* | 2/2019 | Leone | B60W 30/1882 |
| 10,428,784 | B2* | 10/2019 | Leone | F02D 37/02 |
| 2003/0066497 | A1* | 4/2003 | Stanglmaier | F02D 41/0025 |
| | | | | 123/25 F |
| 2013/0297183 | A1* | 11/2013 | Dieler | F02D 41/04 |
| | | | | 701/103 |
| 2017/0138313 | A1 | 5/2017 | Fujimoto | |
| 2018/0022352 | A1* | 1/2018 | Leone | B60W 10/101 |
| | | | | 701/54 |

FOREIGN PATENT DOCUMENTS

| | | |
|---|---|---|
| JP | 2000-204990 A | 7/2000 |
| JP | 2003-314316 A | 11/2003 |
| JP | 2006-299862 A | 11/2006 |
| JP | 2008-169768 A | 7/2008 |
| JP | 2008-175103 A | 7/2008 |
| JP | 2008-175127 A | 7/2008 |
| JP | 2009-138661 A | 6/2009 |
| JP | 2016-138503 A | 8/2016 |
| JP | 2017-089555 A | 5/2017 |
| JP | 2017-190736 A | 10/2017 |

OTHER PUBLICATIONS

Office Action issued in Japanese Patent Application No. 2020-542221 dated Aug. 14, 2021, with machine translation, eight (8) pages.

* cited by examiner

[Fig. 3]
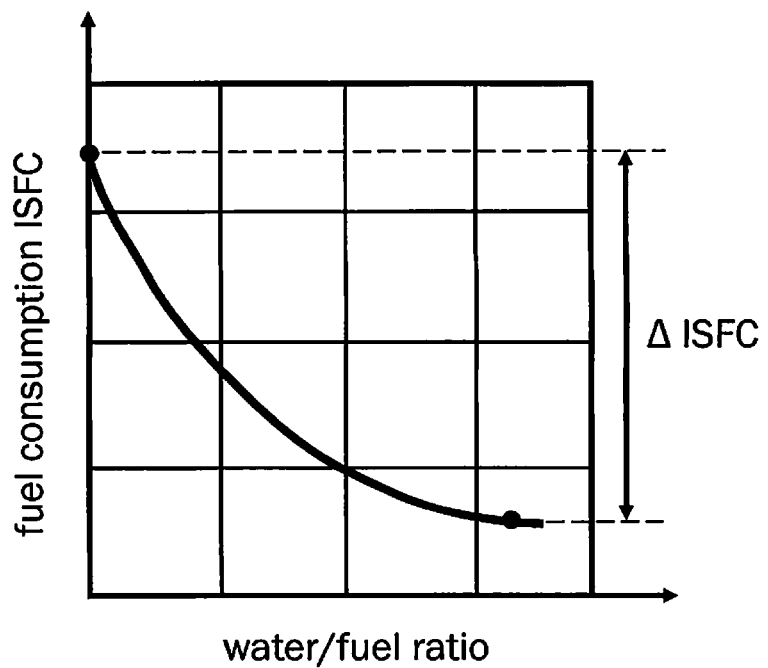

[Fig. 4]
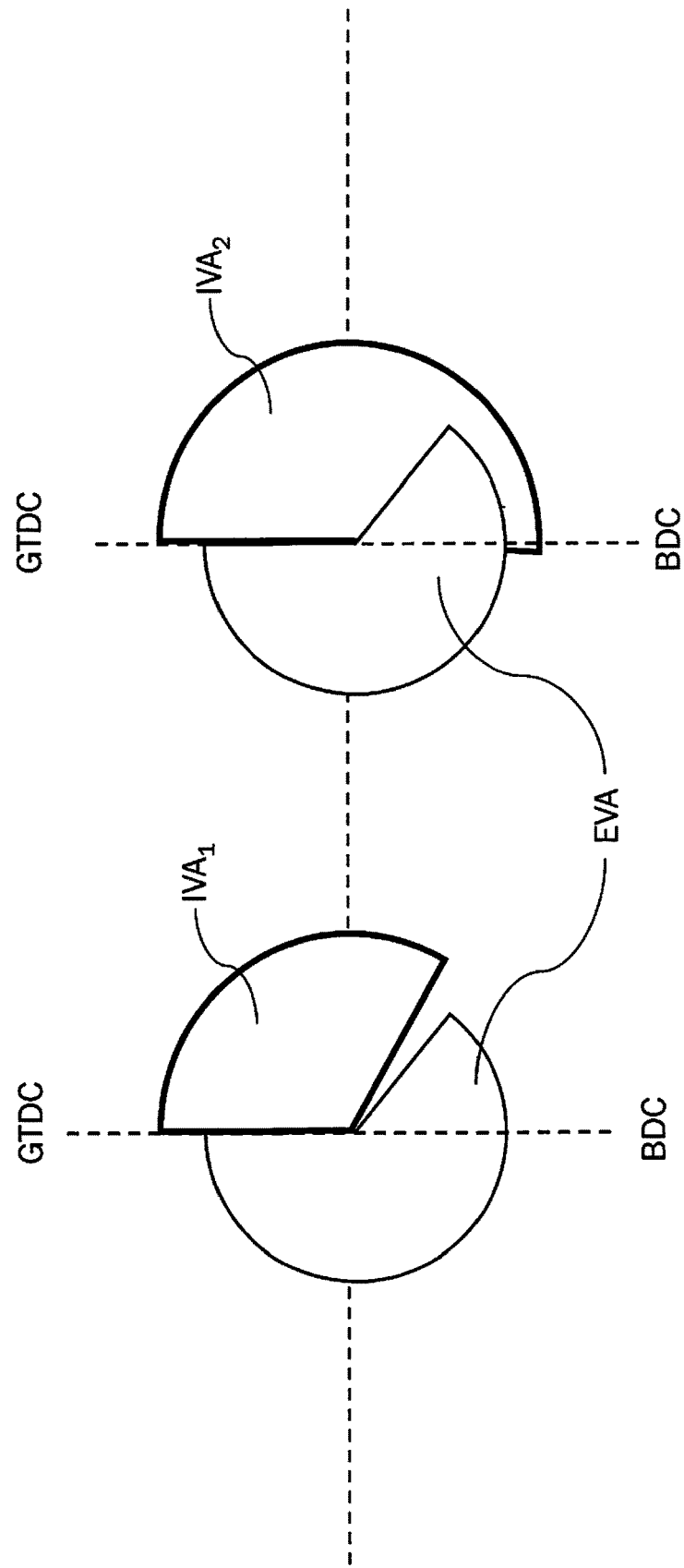

[Fig. 5]
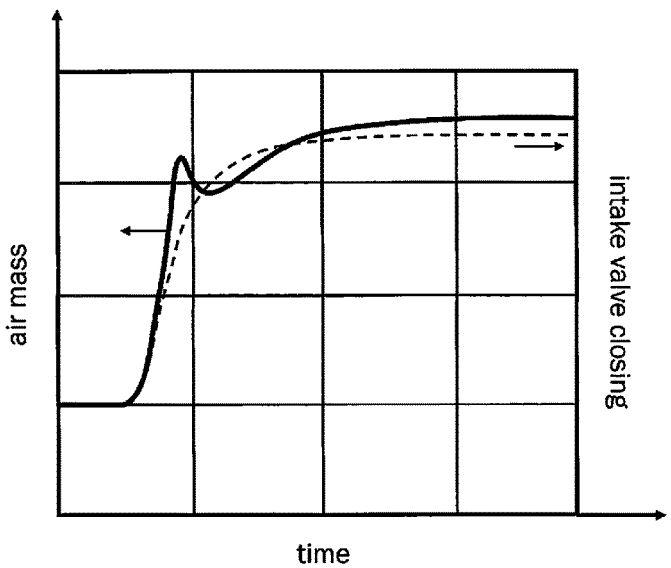
[Fig. 6a]
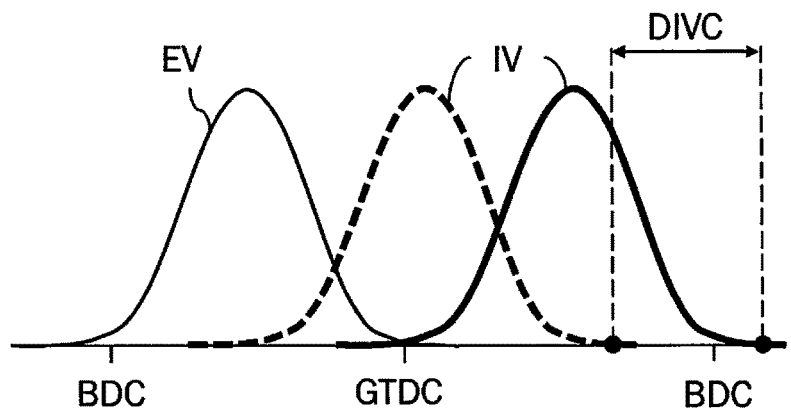
[Fig. 6b]
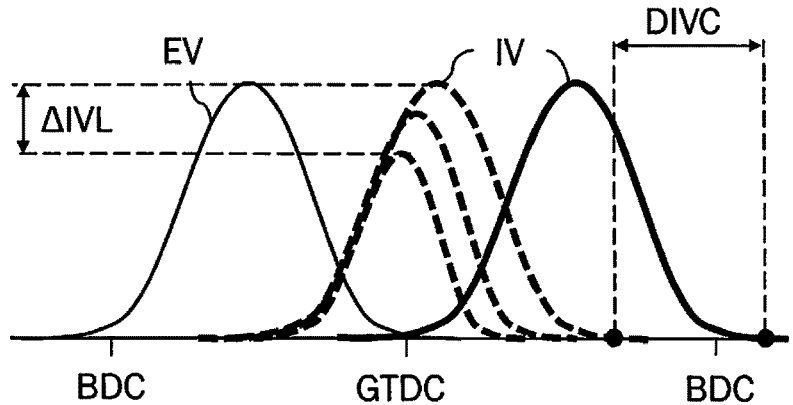

[Fig. 6c]
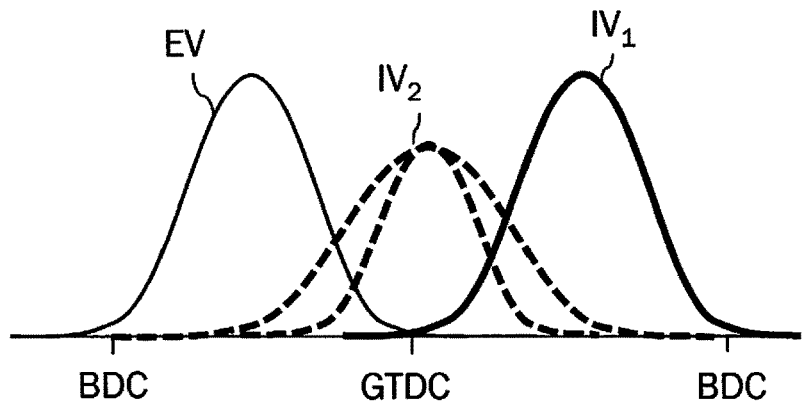
[Fig. 6d]
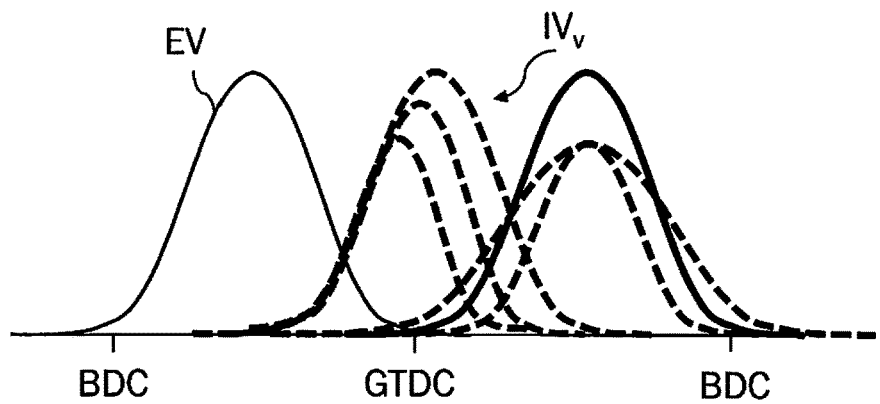
[Fig. 7a]
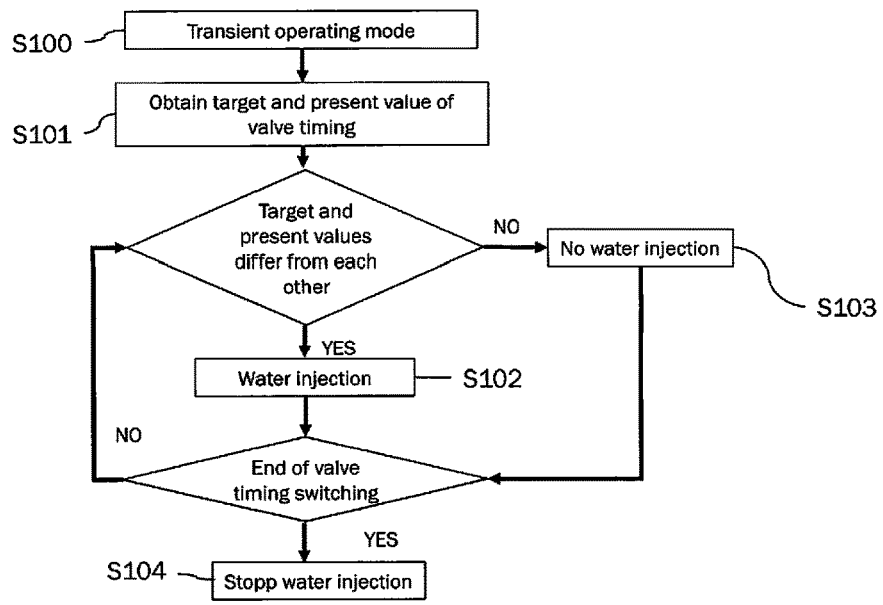

[Fig. 7b]
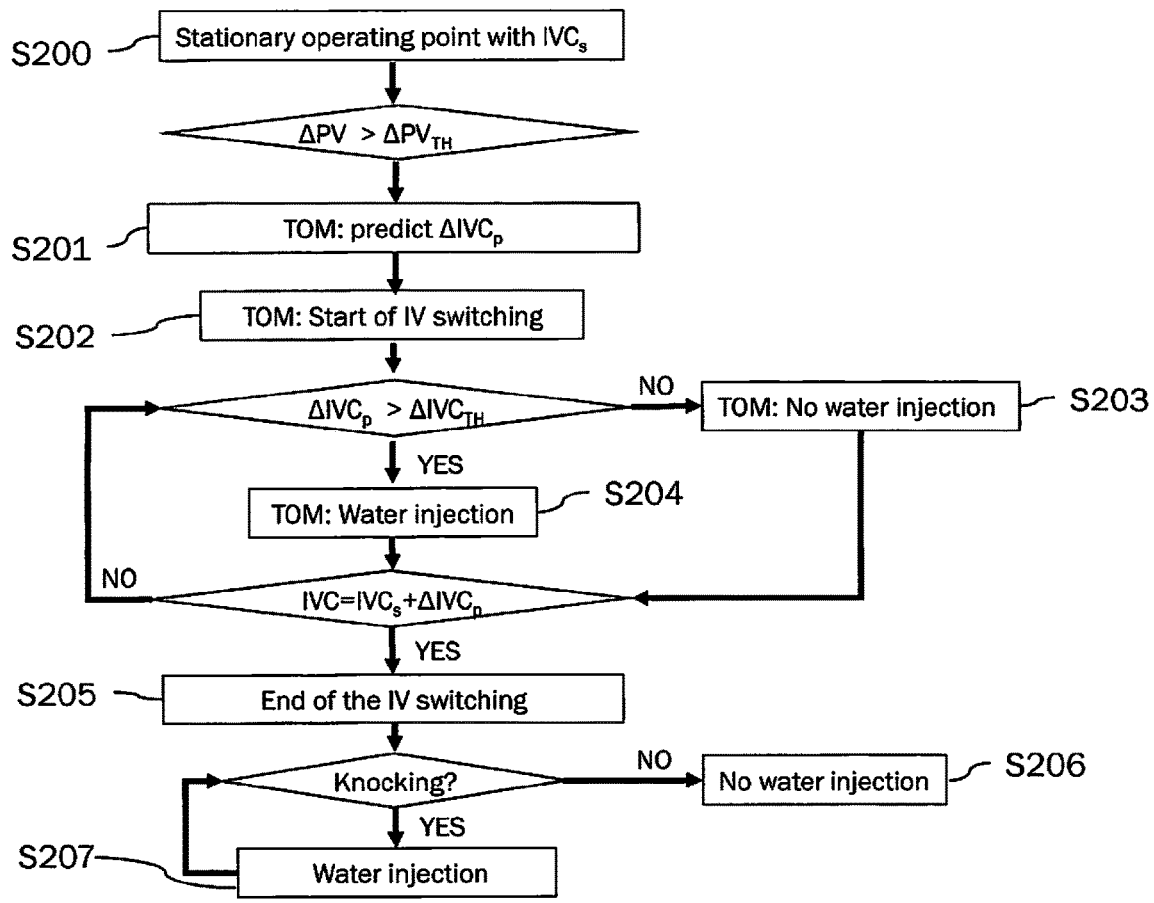
[Fig. 8a]
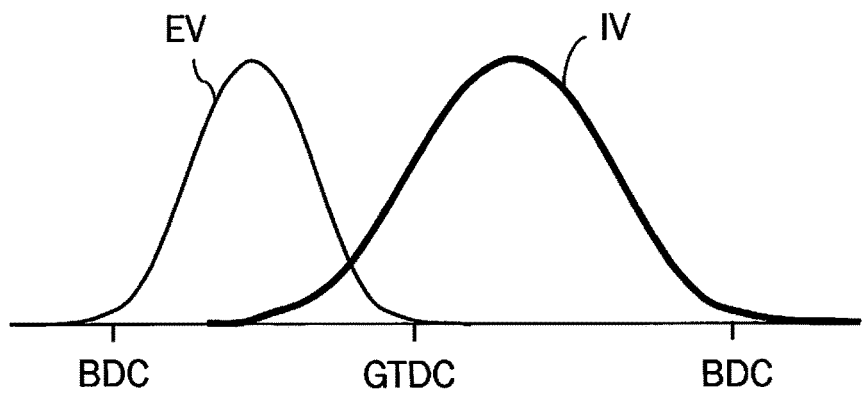

[Fig. 8b]
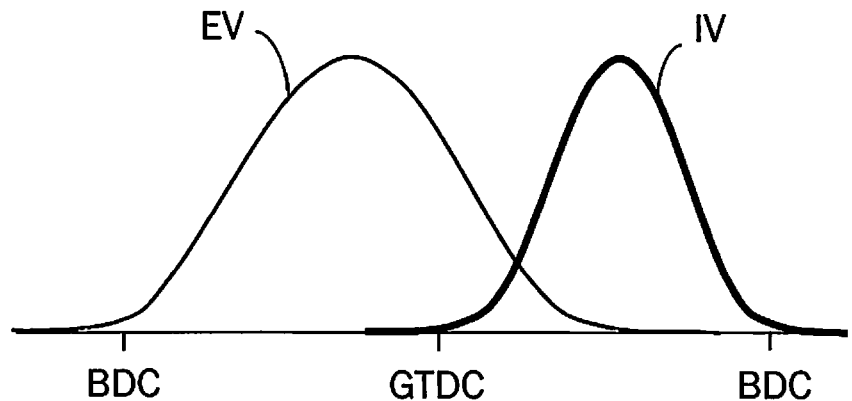
[Fig. 8c]
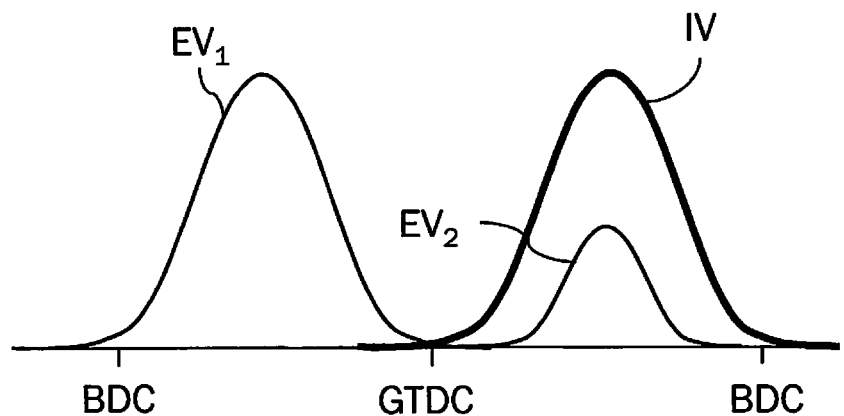
[Fig. 8d]
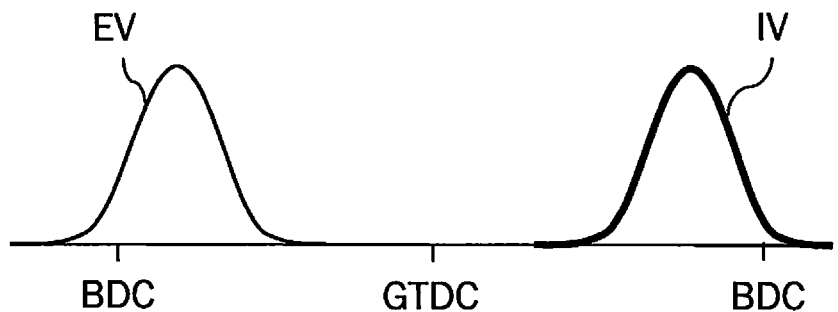

[Fig. 9a]
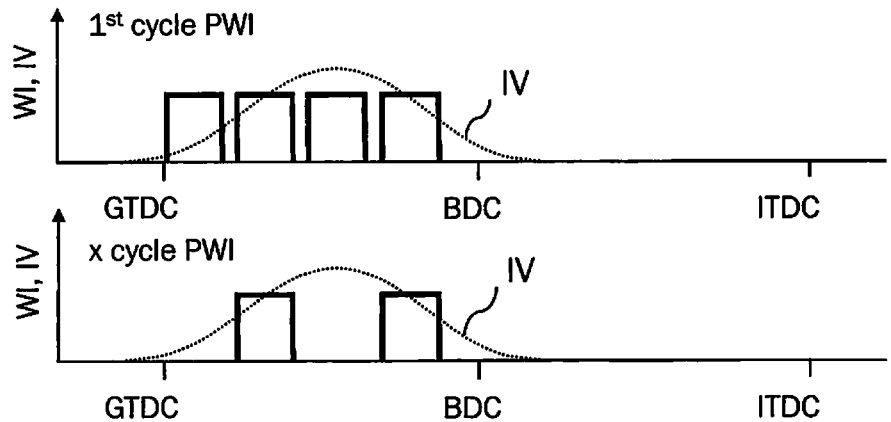
[Fig. 9b]
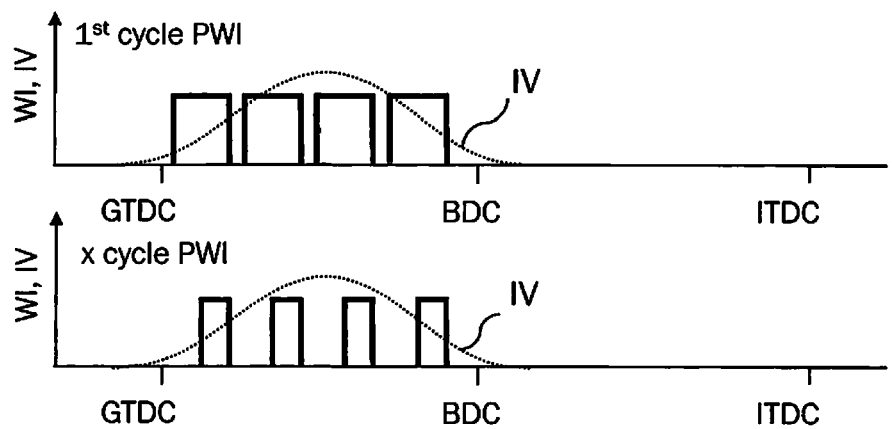
[Fig. 9c]
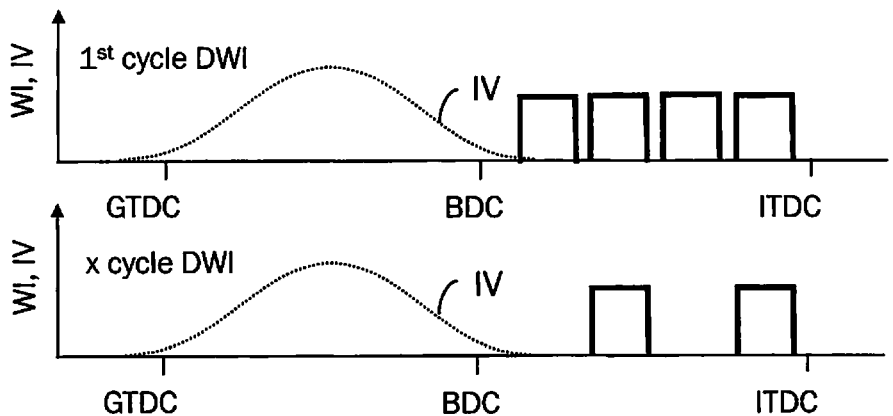

[Fig. 9d]
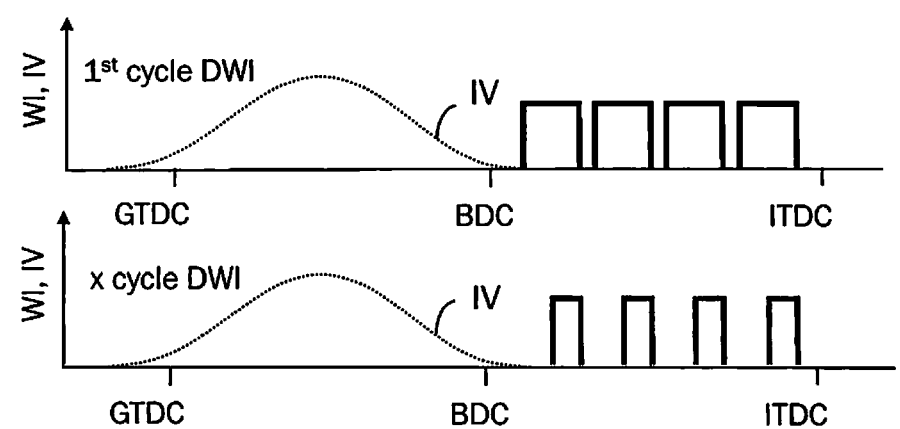

CONTROL OF AN INTERNAL COMBUSTION ENGINE IN TRANSIENT OPERATING MODE

TECHNICAL FIELD

The present subject-matter especially relates to a method and a device to inject a non-combustible fluid into an internal combustion engine. The internal combustion engine may preferably be a charged gasoline engine with a high compression ratio and a variable valve train. The non-combustible fluid is most preferably injected during a transient operating mode of the internal combustion engine. The method, in particular, allows for suppressing knocking in transient (driving) situations to assure fast acceleration response and low fuel consumption.

BACKGROUND ART

It is still a goal for modern internal combustion engines to reduce the combustion temperature and to avoid knocking. Knocking is caused by a self-ignition of unburned charge behind the flame front, which results in high local temperatures and pressure gradients. Therefore, knocking can lead to damages of cylinder components, e. g. the piston or the cylinder head. Especially charged gasoline engines with a high compression ratio, using a variable intake valve train and an early intake valve closing (miller cycle) at mid-load show increased knocking behaviour in transient operating mode. Usually a later ignition timing is used to lower the gas temperature and therefore eliminate the knocking. However, a later ignition timing can lead to a decreased engine efficiency.

JP 2008-169768 A describes a combustion control device for an internal combustion engine with a variable valve gear, an intake air quantity control means, a water injection and a control means controlling the water injection. The water injection is done at light load and early intake valve closing (EIVC) to strengthen the gas flow by the kinetic energy of the injection. In JP 2009-138661 A an engine comprising a variable compression ratio mechanism and a water injection system is described. The water is injected directly into the combustion chamber. JP 2017-89555 A describes a control device of an engine comprising an exhaust gas recirculation (EGR) passage which makes an intake passage and an exhaust passage communicate with each other and makes a part of exhaust emission flow back to a cylinder as an EGR gas. A target value of the EGR rate is set according to an operation state of an engine and when the target EGR rate is increased, a volume of water is supplied into the cylinder, to avoid knocking during the delay time of the EGR rate.

CITATION LIST

Patent Literature

PTL 1: JP 2008-169768 A
PTL 2: JP 2009-138661 A
PTL 3: JP 2017-89555 A

SUMMARY OF INVENTION

Technical Problem

Whereas the above documents describe water injection into an internal combustion engine, so-called "transient knocking", which occurs, e.g., in acceleration situations, is the most common reason for a limited compression ratio in gasoline engines and is still a technical problem. Hence, the herein described and claimed subject-matter especially addresses the technical problem of avoiding engine knocking in transient driving situations to assure the desired acceleration response and to reduce fuel consumption.

Solution to Problem

This technical problem is solved by the invention according to the independent claims. Further preferred developments are described by the dependent claims.

According to the subject-matter of the present application, there is proposed a method for controlling an internal combustion engine which may at least comprise at least one cylinder, at least one injector for injecting a non-combustible fluid into the internal combustion engine and at least one controller (control unit). Preferably the non-combustible fluid is not/not fully combusted (i.e. at least partially inert) during the combustion within a cylinder of an internal combustion engine. More preferably, the non-combustible fluid is a gas or liquid with a high latent heat, wherein the latent heat of the fluid is at least $\frac{1}{10}$ of the evaporation enthalpy of water. Most preferably, the non-combustible fluid is water.

Preferably, the at least one non-combustible fluid injector is a water injector and preferably it is disposed so that the non-combustible fluid/water is injected into the cylinder. In this case, it is preferable to provide at least one water injector per cylinder of the internal combustion engine. Alternatively or in addition, the at least one non-combustible fluid injector can be arranged at an air intake port of the internal combustion engine so that the non-combustible fluid is injectable into the air intake port/duct. It may be preferably to have at least one intake port per cylinder. In other words, the injector may be configured/disposed to inject the non-combustible fluid into the intake port and/or into the combustion chamber of the internal combustion engine.

The at least one controller may be integrated into the internal combustion engine or, alternatively, it may be disposed at a position within a vehicle remote to the internal combustion engine and the controller and the internal combustion engine may be connected via one or more signal lines.

The method may in particular comprise the step of injecting water into the internal combustion engine when the internal combustion engine operates in a transient operating mode. The injection may be preferably controlled by the controller of the internal combustion engine, which may be the engine control unit (ECU). However, the control may also be performed by another entity or another controller than the ECU.

The term "transient operating mode" may preferably be construed to entail driving situations during which a change of the load and/or speed and/or valve timing and/or EGR valve opening angle and/or throttle valve opening angle and/or other air-quantity-control device of the internal combustion engine occur. In other words, the internal combustion engine may, e.g., operate in a transient operating mode at a time or during a period at which/during which the load and/or speed and/or any of the air-quantity-control devices of the internal combustion engine changes/varies.

The above described method with the step of performing water injection into the internal combustion engine (briefly: combustion engine or engine) during a transient operating mode has been found to be advantageous in view of reducing combustion temperatures, especially when the combustion conditions change in such a way that the combustion temperature upsurges, e.g., occurring when the load of the engine is rapidly raised or when a hot internal residual gas amount is increased. Further, it was found that the fuel consumption is lowered by the method in the transient operating mode. Therefore, the method can prevent transient knocking, maintain performance of the internal combustion engine and reduce fuel consumption.

Further, the injector may be part of a non-combustible fluid/water injection device or system which may have different configurations. In one aspect, at least one injector may be arranged in the intake port close to an intake valve of the internal combustion engine. The injection may take place during the intake stroke when the intake valve is open. The injected water may flow together with the aspirated air through the intake valve into the cylinder to evaporate therein and cool down the cylinder charge. In another aspect, when the internal combustion engine includes a port fuel injection (PFI), the water may be merged with the fuel before the injector and a water-fuel emulsion may be injected in the intake port in front of the intake valves. In another aspect, when the internal combustion engine includes a PFI and a direct fuel injection (DI), the port fuel injector may be used to inject water and/or fuel into the intake port. Also, the direct fuel injector may be used to inject water and/or fuel into the cylinder.

Further, dependent on the engine load a switching between port fuel and port water injection may take place or a mixture of water and fuel may be injected in the intake port. At low load the fuel may be injected into the intake port to improve the homogeneity of the air-fuel mixture and to avoid unburned hydrocarbons. At these low load points no water injection would be necessary because there is a rather low risk of knocking, however, it can be used. At high loads the fuel may be injected directly into the cylinder to use the evaporation heat of the fuel to cool down the cylinder charge. Additionally, the water injection into the intake port may support lowering the charge temperature and avoid knocking.

In another aspect the water may be injected directly in the cylinder, which is an effective method to cool down the cylinder charge, especially regarding transient situations. There may be a separate water injector disposed in the cylinder head for injecting water into the cylinder or the water may be merged with the fuel before the high-pressure pump and a fuel-water-emulsion may be injected into the cylinder. In this case only one high pressure injector and only one high pressure pump for fuel and water would be necessary. A combination of the previously described injection aspects may also be realized. Additionally, at least one other water injection valve may be mounted at a central position in the intake manifold. A water injection into the intake manifold may take place before the intake valve opens to cool down the aspirated air before it reaches the cylinder. This additional water injection valve may be combined with the previously described aspects of a water injection into the intake port and/or the cylinder.

Further, the method may include the following steps, which may preferably be carried out by the controller. Accordingly, the controller may detect and/or predict the start of the transient operating mode. The controller, additionally or alternatively, may detect and/or predict the duration of the transient operating mode. Further, the controller may activate the water injection when the start of the transient operating mode was determined and/or at the predicted start of the transient operating mode. Further, the controller may also end the water injection after detecting the end of the transient operating mode or after the expiry of the predicted/determined duration of the transient operating mode.

For detecting a transient operating mode, e. g., a position of a pedal (as a pedal-value) of a vehicle in which the internal combustion engine is disposed and or a first derivative of the position of the pedal (value), e.g. the change of the position over time, may be used. The pedal may, e.g., be the acceleration pedal or the brake pedal. These pedal values provide information about the target operating point and how fast it should be achieved. For example, it may be defined that if the gradient of changing the pedal position is larger than a predefined threshold, a transient operating mode is active. Further, a change in the pedal-value may require a reaction of multiple actuators of the internal combustion engine. Since every actuator may have a response delay time, the target values of the actuators may be used to predict the conditions of the target operating point in the cylinder. Additionally, dependent on response characteristic(s) of the different actuators, the start and the duration of the transient operating mode may be determined. For example, the target value of the intake valve closing and/or multiple values out of the intake valve switching sequence may be used to predict the expected air mass and the expected temperature. For this purpose, the control schemes which represent the behaviour of the applied actuators may be stored in the controller.

Further examples for detecting and/or predicting a transient operating mode are also entailed by the claimed subject-matter. For example, the load or the rotational speed of the internal combustion engine may be measured/determined/calculated and if a change to the load and/or the rotational speed happens, it is checked whether the load/rotational speed changes by more than a predetermined value, which may be expressed in percent, or faster than a predetermined value, which may be expressed in time or difference per time. A further example, especially for predicting a transient operating mode, may be the use of data which is provided by external area sensors; e.g.: a stereo camera of the vehicle may discern, when driving on a street having a speed limit at the actual driving sector, that a street sign is ahead which increases the speed limit or which indicates the end of the speed limit for a driving sector of the street ahead. The prediction may then include that the driver may accelerate the vehicle at the beginning of the driving sector in which a higher speed limit or no speed limit applies. Given the actual driving speed and the distance to the next driving sector allows calculating/predicting the start of a transient operating mode, which is the start of driving sector with the amended speed limit. Further, the before described prediction may also be used when a slower vehicle is detected on the street ahead. Assuming that the driver will overtake the slow vehicle, the start of the transient operating mode can be predicted/calculated at the point in time when the overtaking will take place which can be estimated based on the given distance and the travelling speeds of the two vehicles. Further, the transient operating mode may also be determined based on a change of the travelling speed of the vehicle which may also be tracked by information from vehicle-external systems, such as the global positioning system. A plurality of transient operation mode determination and prediction options may be combined.

By detecting/predicting the transient operating mode, which may be carried out by the controller in a preferred aspect, the water injection can be timed precisely and the above described benefits of the water injection during the transient operating mode are put into practice optimally.

Further, the method may include the following step, which may preferably be carried out by the controller. Accordingly, the controller may control a variable valve train of the internal combustion engine which may vary the valve opening/closing timing. The variable valve train may switch the intake valve closing timing from a first crank angle to a second crank angle, wherein the second crank angle may be larger than the first crank angle. Alternatively or additionally, the variable valve train may switch the intake valve closing timing from a third crank angle to a fourth crank angle, wherein the fourth crank angle may be smaller than the third crank angle.

In order to reduce pumping losses of the internal combustion engine and to lower the combustion temperature, different valve strategies relating to the intake valve closing may be used. With regard to the pumping losses an early intake valve closing (EIVC) or a late intake valve closing (LIVC) are beneficial for avoiding throttling losses caused by a throttle plate. Using EIVC the intake valve may be closed in the course of the intake stroke when the desired cylinder charge has flown into the cylinder. Then, the trapped cylinder charge is expanded until the bottom dead center is reached. Therefore, temperature and pressure of the cylinder charge at the start of the compression stroke are lower compared to a conventionally throttled engine.

Further, the intake valve may be closed in the course of the compression stroke after the piston passed the bottom dead center (LIVC), so that a portion of the aspirated charge may flow back into the intake manifold. Caused by a heat transfer from the cylinder walls to the gas which flows back into the intake manifold, the charge temperature at the start of compression may be higher using LIVC compared to EIVC. EIVC and LIVC may be used at low loads in natural aspirated engines with the focus on minimizing throttling losses. Combined with a turbocharger, particularly EIVC may also be used at higher loads up to rated power for lowering the charge temperature to avoid knocking. However, at lower speeds the turbocharger may not be able to deliver the desired air mass to realize EIVC at full load. Then it may be beneficial to change to a later intake valve closing timing which may lead to a raise in charge temperature.

In an acceleration case, when the engine must rapidly reach full load at low speed and the intake valve has to switch to a larger crank angle, the risk of knocking is high. In such a situation the water injection can be added to effectively suppress knocking by the injection of water into the intake port and/or into the combustion chamber especially during a transient operating mode.

In a further example, the internal combustion engine may be equipped with a mechanism for varying the compression ratio. The mechanism may perform a two-point switching or a continuous displacement of the compression ratio. A reduced compression ratio at high loads may also avoid knocking, but the switching of the compression ratio may last several combustion cycles. Therefore, the above described method of injecting water is an additional measure to suppress knocking in transient situations, in which the device for varying the compression ratio may not react fast enough.

Another example, may include an external exhaust gas recirculation (EGR) as a further instrument to avoid knocking. Since an external EGR may have a long response time because of the required length of the pipes, the additional injection of water according to the here described method during a switching of the EGR rate effectively suppresses knocking in the transient operating mode.

Further the method may include the step, preferably carried out by the controller, of controlling a variable valve train of the combustion engine to vary an amount of internal residual gas from a first residual gas value to a second residual gas value, wherein the second residual gas value may be larger than the first residual gas value. A high amount of residual gas can advantageously support a de-throttling of the internal combustion engine. Different valve strategies may be used to obtain the desired amount of residual gas in the cylinder. Depending on the pressure ratio between the intake and the exhaust port and the variances of the valve train, the residual gas may be re-aspirated in the intake port, drawn out of the exhaust port or the desired amount of residual gas may be trapped in the cylinder. The different valve strategies may cause different residual gas temperatures, which may raise the risk of knocking also at lower loads. To avoid knocking in a transient operating mode, especially when load points with a high amount of hot residual gas may arise, the claimed method may determine and/or predict the occurrence of such load points and inject the desired amount of water at that time/point.

The method may further comprise a step which may be carried out by the controller by which water may be injected during a switching period, wherein in the switching period it may be switched from or to an early or late intake valve closing timing. This means, in particular, that water is injected during a transient operating mode and when an intake valve closing timing switching is performed. The switching may include the switching from a Miller cycle, i.e. EIVC, to a non-Miller cycle or vice versa, i.e. switching on or off the EIVC. Further, the switching may include switching off or on a late intake valve timing. In the switching period during which the transient operating mode is active as well, water injection can reliably suppress transient knocking. However, the water injection may also be performed during the switching period at which no transient operating mode is active.

Hence, as already noted above, the water injection can reduce transient knocking, especially when a transient operating mode is active, a rapid acceleration is demanded, and/or an internal EGR system is used.

The method may further comprise, preferably carried out by the controller, a step of decreasing an amount of injected water from a first combustion cycle within the transient operating mode to a subsequent combustion cycle within the transient operating mode. It was found to be technically beneficial in view of suppressing knocking in a transient situation to lower the charge temperature immediately at the beginning of the transient operating mode by starting the fluid injection in the first transient cycle with the highest amount of water, wherein in the subsequent cycles of the transition mode the amount of injected water may be reduced to save water.

Furthermore, the method may include the step which is preferably conducted by the controller to decrease a period of water injection from the first combustion cycle within the transient operating mode to a subsequent combustion cycle within the transient operating mode. Especially, when the water injector is arranged in the intake port and no additional central injector in the intake manifold is used, the water injection of the first transient combustion cycle may start up to 180 degrees before the intake valve opens and may last until the intake valve closes. The long period of water injection before the intake valve opens lowers the intake charge temperature and ensures a sufficient water supply in the first transient combustion cycle. In the subsequent cycles of the transition mode the injection timing may be shortened to save water.

Further, the method may include splitting the total amount of injected water. This may be controlled by the controller as well as injecting the water amount over a plurality of (multiple) water injections to avoid wall wetting at the walls of the intake port or, when a direct water injector is applied, at the cylinder walls. Especially, in the first transient cycle with the preferably highest amount of water being used, the controller may split the injection in a higher number of multiple injections and may decrease the number of multiple water injections or the injection period of each injection of the multiple water injections from the first combustion cycle within the transient operating mode to subsequent combustion cycle(s) within the transient operating mode.

Further, the method may include that the controller may increase the ignition energy of the spark ignition from a predefined first ignition energy value which may be around 50 mJ to a predefined second energy value which may be around 300 mJ when it performs water injection. The here claimed method of water injection is an effective alternative to a late spark angle in order to suppress knocking, the combustion phasing can be earlier which results in a higher cylinder pressure at ignition timing and therefore in a higher desired ignition voltage of the spark plug. Additionally, the decreased cylinder temperature may deteriorate the ignition conditions. Therefore, it is advantageous to increase the ignition energy during the water injection during a transient operating mode to stabilize the flammability of the cylinder charge. According to a preferred aspect, the controller may decrease the second energy value of the ignition energy from the first combustion cycle of the transient operating mode with water injection to a subsequent combustion cycle of the transient operating mode with water injection, because the first cycle of the transient operating mode may include the highest amount of injected water and may therefore need the highest ignition energy. For increasing the ignition energy, the controller may provide a predefined longer spark duration which may add up to about 5 ms or provide a predefined number of multiple spark ignitions which may vary from 1 to 20 ignitions.

Further, the claimed subject-matter may entail a control device which may perform the above described method steps, and an internal combustion engine which may comprise at least one cylinder, at least one intake port, and a water injection device. Further, preferably, the internal combustion engine may have a variable valve train, a turbocharger and/or an internal EGR system. The engine may be a gasoline engine with a high compression ratio, e.g. 14 to 18. The turbocharger and the variable valve train may perform early intake valve closing in a range up to 90 degrees before BTDC. The control device or the controller may be included in the internal combustion engine, wherein "include" may mean that the controller is physically integrated with the engine or that it is remotely arranged, however, connected thereto by signal lines and the like.

Further, the claimed subject matter may include a computer program product storable in a memory comprising instructions which, when carried out by a computer or a computing unit, cause the computer to perform the above described method or aspects thereof, as well as a computer-readable [storage] medium comprising instructions which, when executed by a computer, cause the computer to carry out said method or aspects thereof.

Advantageous Effects of Invention

Summarizing, the invention provides a method to avoid knocking in an internal combustions engine, preferably in a gasoline engine with a high compression ratio and a variable valve train which is able to perform EIVC, by injecting a non-combustible fluid, which is preferably a liquid and most preferably water, into the intake port and/or in the cylinder, when a transient operating mode is detected and/or predicted by a controller. The method ensures spontaneous acceleration response and avoids high fuel consumption during transient situations.

In the following the claimed subject-matter will be further explained based on at least one preferential example with reference to the attached exemplary drawings, wherein:

BRIEF DESCRIPTION OF DRAWINGS

FIG. 3 illustrates a diagram with a schematic trend of fuel consumption as a function of water/fuel ratio.

FIG. 4 shows a schematic valve angle diagram with two different intake valve angles.

FIG. 5 depicts a signal-time-diagram with a schematic trend of air mass and intake valve closing.

FIG. 6a schematically shows one of different intake valve curves dependent on the variabilities of the intake valve train.

FIG. 6b schematically shows one of different intake valve curves dependent on the variabilities of the intake valve train.

FIG. 6c schematically shows one of different intake valve curves dependent on the variabilities of the intake valve train.

FIG. 6d schematically shows one of different intake valve curves dependent on the variabilities of the intake valve train.

FIG. 7a illustrates by means of a flow chart examples of a sequence of method steps.

FIG. 7b illustrates by means of a flow chart examples of a sequence of method steps.

FIG. 8a schematically shows one of different valve strategies for trapping residual gas in the cylinder.

FIG. 8b schematically shows one of different valve strategies for trapping residual gas in the cylinder.

FIG. 8c schematically shows one of different valve strategies for trapping residual gas in the cylinder.

FIG. 8d schematically shows one of different valve strategies for trapping residual gas in the cylinder.

FIG. 9a depicts one of examples of different injection strategies for a split injection of water.

FIG. 9b depicts one of examples of different injection strategies for a split injection of water.

FIG. 9c depicts one of examples of different injection strategies for a split injection of water.

FIG. 9d depicts one of examples of different injection strategies for a split injection of water.

DESCRIPTION OF EMBODIMENTS

Figure 1:
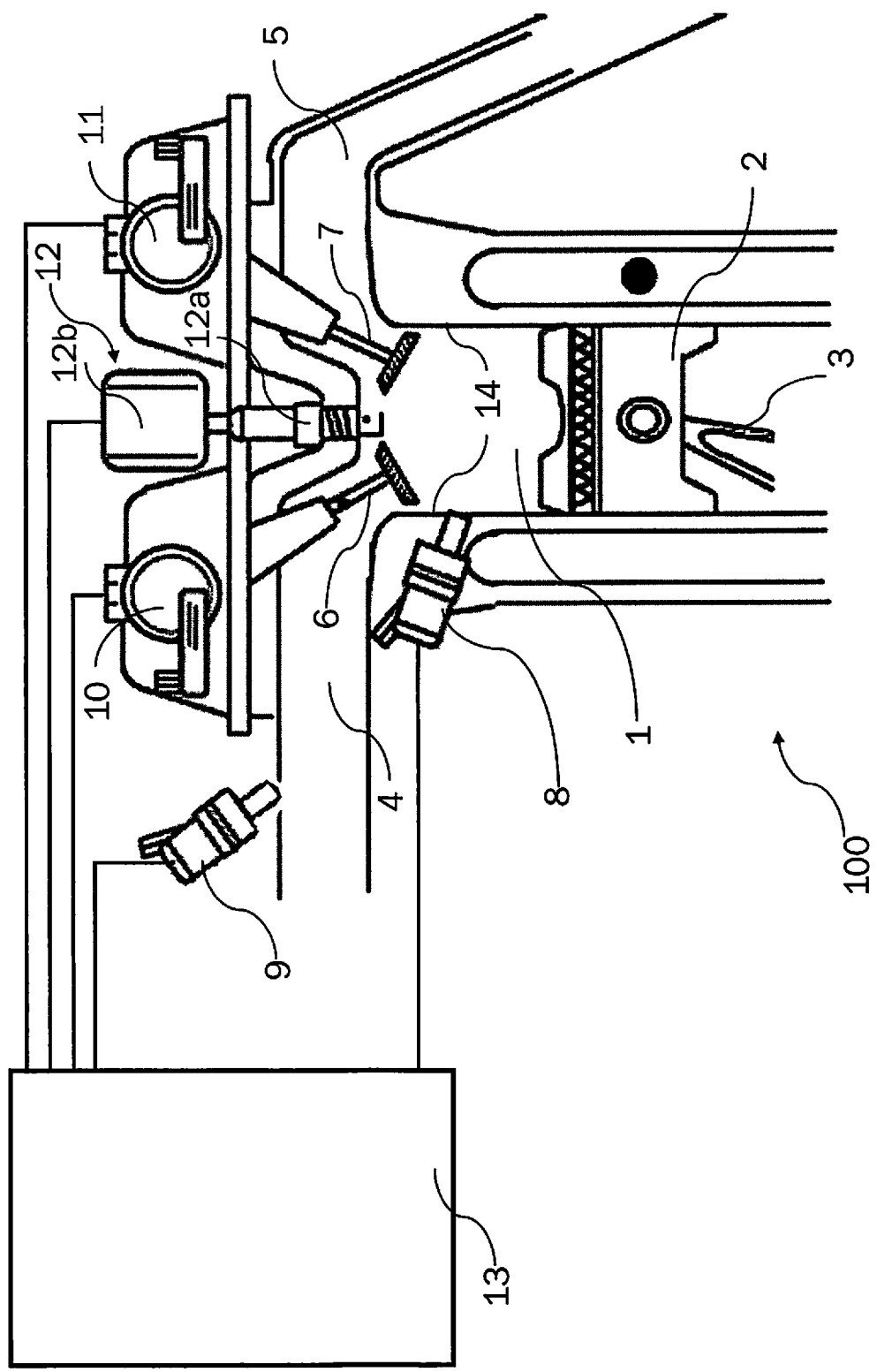
FIG. 1 depicts a schematic view of a cylinder of an internal combustion engine.

FIG. 1 depicts an exemplary cylinder 100 of an otherwise unspecified internal combustion engine, which may have more than one cylinder 100. The engine may, for example, have two, three, four, six, eight or less/more cylinders 100. The cylinder 100 comprises a combustion chamber 1 in which a piston 2 with a connecting rod 3 is disposed allowing it to travel. The connecting rod 3 is connected to a crankshaft (not depicted) that can be a crankshaft as known.

An (air) intake port 4 with an intake valve 6 as well as an exhaust port 5 with an exhaust valve 7 are connected to the combustion chamber 1. Ambient air is drawn into the combustion chamber 1 through the intake port 4. Exhaust gases are discharged from the combustion chamber 1 via the exhaust port 5. A spark ignition unit 12 comprising a spark plug 12*a* and an ignition coil 12*b* is attached to the internal combustion engine. The spark ignition unit 12 preferably offers a variable spark duration or multi-spark ignition. The internal combustion engine (or briefly: "combustion engine" or "engine") may have one or more spark ignition units 12. Preferably, it has at least one spark ignition unit(s) 12 per cylinder 100. The spark plug 12*a* as well as a fuel injector 8, or at least parts thereof, are connected to the inside of the combustion chamber 1 so that a spark and fuel can be introduced/injected into the combustion chamber 1. The high-pressure fuel supply of the fuel injector 8 is not depicted. The fuel injector 8 may preferably be a direct fuel injector 8. Further, the fuel injector 8 may preferably be an electrohydraulic fuel injector or a piezoelectric fuel injector. The internal combustion engine may be equipped with one or more intake valve phasing actuator(s) 10 and/or one or more exhaust valve phasing actuator(s) 11. The intake valve phasing actuator 10 is preferably used for realizing early intake valve closing. The exhaust valve phasing actuator 11 is preferably used for adjusting residual gas and/or for varying an exhaust valve opening timing. The valve phasing actuators 10, 11 are preferably hydraulic actuators or electric actuators. Other means for controlling the intake and exhaust valve opening/closing timings may be applied in addition or alternatively. Even further, if not otherwise indicated in the aspects described below, the herein claimed subject-matter may also entail an internal combustion engine which does not have an intake/exhaust valve opening/closing timing means.

Further, a non-combustible liquid injector 9 is connected to the intake port 4 of the cylinder 100. Since most preferably the liquid to be injected is water, even though other liquids having a high evaporation enthalpy may be used as well, the term "water injector" is used as one specific example for a non-combustible liquid injector 9. The water injector 9 may be a low-pressure injector with an injection pressure of up to 3 bar or a high-pressure injector with an injection pressure of more than 3 bar. As an alternative to the water injector 9 connected to the intake port 4 (as shown in FIG. 1), or in addition thereto, one or more water injectors 9 may be connected to the cylinder wall 14 of one cylinder 100 to inject water directly into the combustion chamber 1.

FIG. 1 further shows a controller 13 which is electrically connected to the spark ignition unit 12, the valve phasing actuators 10, 11, the direct fuel injector 8 and the water injector 9. The controller 13 controls the multiple units/injectors/actuators. The controller 13 may, for example, be the engine control unit (ECU). The controller 13 may also be any other control unit, and signal line connections between the controller 13 and the controlled units may differ from the example of FIG. 1. For example, there may be a plurality of controllers 13 which may control subgroups of the controlled units, e.g. one controller 13-1 may control only fuel injectors, another controller 13-2 may control only water injectors 9 and so on. Even further, if there is a plurality of controllers 13, these controllers 13 may be interconnected with each other hierarchically or in another way.

Further, pressure sensors which are not shown may be disposed in the combustion chamber wall 14 so that the pressure within the combustion chamber 1 can be measured. Measuring the pressure within the combustion chamber 1 can support a feedback control of the amount of water to be injected. For example, the amount of water to be injected by the injector 9 may be determined by a feedforward control within the controller 13 in accordance with predefined internal combustion engine states. E.g., the feedforward control may use a map, a table or the like to determine the amount of water to be injected depending on the engine state, which may be defined by parameters and which are used to look up the amount of water to be injected. The parameters may be the load of the engine and the rotational speed based on which the amount of water may be read from the lookup map, table or the like. The amount of water to be injected which was set by the feedforward control may, subsequently, be corrected based on the real pressure within the combustion chamber 1. This may include that the feedforward control assumes that the combustion phase of the combustion cycle is "on time", i.e. neither ahead of the timing nor delayed, and that this assumption may not correspond to the real conditions because the combustion phase of the combustion cycle may be delayed. Such a deviation between the target timing and the real timing of the combustion phase may then be compensated by a feedback control which is used to correct/adapt the water amount determined by the feedforward control. For example, the timing may be determined by comparing a target pressure at a specific point within the combustion cycle, e.g. the point of 50% total burn rate (MFB50), with the real pressure measured by the pressure sensor at this point. The point may be determined by the crank angle value or the like. The technical benefit of the feedback control is that especially in case of a delayed timing water can be saved which has to be carried in a water tank 15 of the vehicle.

Figure 2:
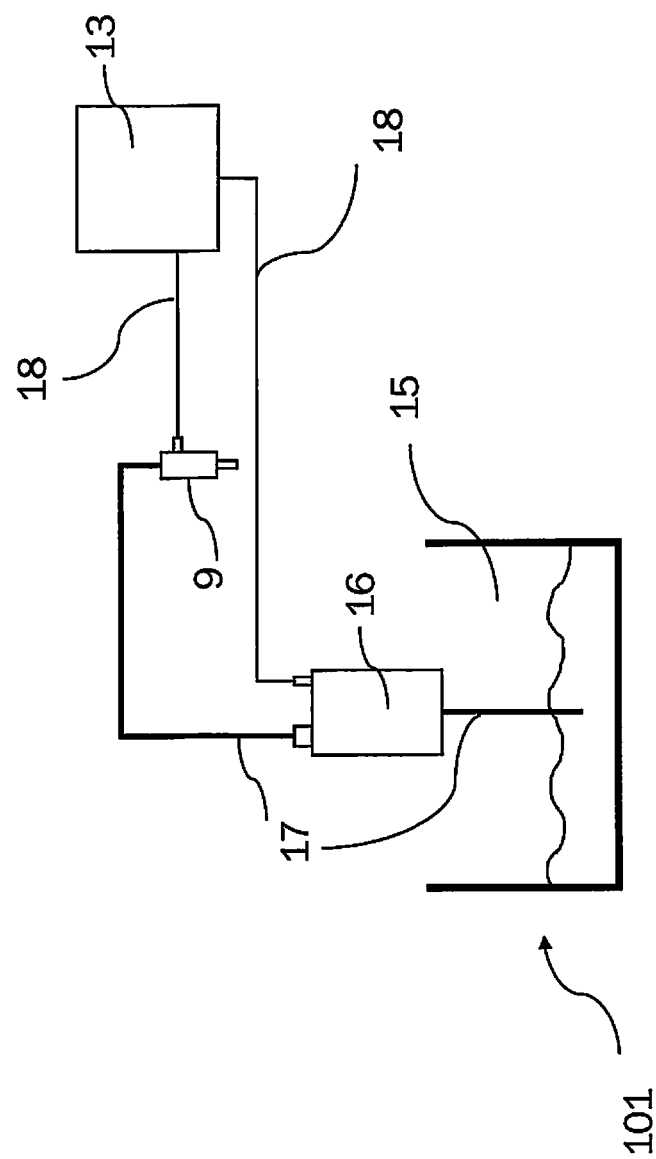
FIG. 2 shows a schematic view of a water injection device.

FIG. 2 shows a water injection device 101 of an aspect in which the non-combustible fluid is water. The water injection device 101 has a water tank 15, a water pump 16 which can supply water from the water tank 15 to the water injector 9 via a water pipe/tube 17. The water injector 9 and the water pump 16 are electrically connected with the controller 13 via signal lines 18. The controller 13 may, inter alia, control the injection pulse width/time, the injection pressure and/or the injection timing. For example, the controller 13 may be adapted to vary the injection pulse width/time so that the amount of water being injected into the engine may be varied. As described above, the water injector 9 may be arranged so that water may be injected directly into the combustion chamber 1. Alternatively or additionally, the water injector 9 may be connected to the intake port 4 so that water may be injected into the stream of air sucked into the combustion chamber 1. The water may further be injected so as to form a mixture of air and water.

The water injection device 101 according to FIG. 2 is a schematic example which may include further non-shown and/or optional members, such as a fluid rail for connecting multiple water injectors 9, such as sensors for temperature, pressure and the like, such as further signal lines, such as further water lines/tubes for recirculation of water or the like, such as valves, and/or such as further actuators, pumps and the like.

The diagram in FIG. 3 illustrates a schematic trend of fuel consumption as a function of water/fuel ratio. At high loads, e.g. at rated power, it may be difficult to run a spark ignited gasoline combustion engine with an optimized combustion phasing because the earliest possible ignition angle is limited by engine knocking. The here described water injection into the intake port 4 and/or in the cylinder 100 during the intake stroke leads to a drop of the gas temperature in the cylinder 100 which allows for an optimized combustion phasing and avoids enrichment of the air-fuel mixture. Therefore, a significant reduction of the fuel consumption is achievable with the claimed water injection, especially at high engine loads.

FIG. 4 schematically shows a switching of the intake valve crank angle from a first intake valve angle $IVA_1$ to a second intake valve angle $IVA_2$ (from left to right part of FIG. 4), whereas $IVA_1$ represents an early intake valve closing and $IVA_2$ represents an intake valve closing which may be applied when a higher volumetric efficiency is required (no EIVC). The switching may for example be carried out when changing from a low or mid load of the engine to high load. The exhaust valve angle EVA stays constant in this schematic diagram but may also be changed. The switching of the intake valve angle as shown in FIG. 4 can cause a rise of the compression end temperature in the cylinder 100 which could lead to undesirable knocking. In such a situation, the here described controlled water injection during the valve angle switching suppresses the knocking. In other words, the method of suppressing knocking by water injection can beneficially applied, e.g., in the scenario during a switching of the (intake) valve angle closing/opening timing. One example for such an application scenario during the valve angle switching is shown by FIG. 4, and the water injection may be performed until the end of the switching period, i.e. until the switching of the valve timing is completed.

FIG. 5 depicts a signal-time-diagram with a schematic trend of the air mass (solid line) and the intake valve closing timing (dotted line). When the intake valve closing timing changes to a larger crank angle the air mass in the cylinder 100 upsurges during the valve timing change/switching. One can see an overshoot of the air mass before the intake valve closing reaches its final value. The event of that overshoot usually corresponds to an incidence of knocking, because the rapidly increasing air mass leads to a rise in the cylinder temperature (not depicted). This knocking can be prevented by the here described water injection method, and the water injection may be performed until the air flow variation has decreased or the air flow is stable again.

The FIGS. 6a-d illustrate examples for intake valve curves caused by different variabilities in the intake valve train to realize an early intake valve closing. The presented method of injecting water during a switching of the valve timing can also be applied within an engine providing the following switching/changing options. FIG. 6a shows a change in the phasing of the intake valve 6, which results in an earlier intake valve closing but also in an earlier intake valve opening and therefore in a larger valve overlap of the intake 6 and the exhaust valve 7. Dependent on the pressure drop between exhaust 5 and intake port 4, the larger valve overlap may lead to an unwanted increase of internal residual gas. For de-throttling at part load a high amount of residual gas may be useful but at light load it may lead to unstable combustion. Therefore, using a cam phaser may enable an early intake valve closing only in a limited part of the engine map and a throttle plate may be still necessary to control the load of the gasoline engine. As a further step to a higher variability, FIG. 6b shows a change in the intake valve lift besides the change in the intake valve phasing. Such a valve train may allow for an early intake valve closing in a wide range of the engine map and is able to control the load and the residual gas by changing the valve lift. FIG. 6c depicts intake valve curves of an intake valve train which includes two valve profiles with different valve lifts ($IV_1$, $IV_2$) in which $IV_2$ offers the additional possibility to vary the length of the intake valve opening time. At high load the valve curve $IV_1$ may be in use whereas at part and low load the valve train may be switched to $IV_2$. Finally, in FIG. 6d a fully variable intake valve train is depicted, which may allow for varying the valve timing, the valve lift and the length of the valve opening time.

The flow chart of FIG. 7a shows an example for a possible sequence of steps when a transient operating mode was detected. The transient operating mode may be detected by the controller 13 based on a change of the load of the engine and/or the rotational speed. For example, the controller 13 may detect that a change rate (a variation over time) of the load and/or the rotational speed exceeds a predefined threshold which is interpreted as a transient operating mode. The duration of the transient operating mode may be defined to be the period during which the change rate is over the threshold value. Assuming that the transient operating mode was detected (see step S100 in FIG. 7a), FIG. 7a now shows an application scenario of the presented method which includes the water injection during a valve timing switching, for example a change from a miller cycle to a non-miller cycle or the like. The detection of a switching period may be performed, as one possible example, by comparing the actual value of the valve timing, e.g. expressed via a crank angle or the like, with the input target value (cf. FIG. 5). If the two values differ from each other or if they differ by more than a predetermined threshold, it may be detected, e.g. by the controller 13, in step S101 and above described comparison that a switching period has started and water injection is initiated in step S102. Otherwise, step S103, the water injection may not be initiated. However, in other examples of the here described method, water may anyways be injected, for example, if water shall always be injected during a transient operating mode, i.e. irrespective whether a switching of the valve timing takes place or not. After step S103, a comparison of the actual valve timing value and the target value is again carried out and if the difference of the values is not below the threshold, switching is detected to continue. Otherwise, the end of the switching period is detected or predicted to be close and the water injection is stopped in step S104.

The above example of FIG. 7a shows the example that water is injected during a valve switching action. However, water injection may alternatively or additionally be carried out during other conditions, such as when a rapid acceleration (an acceleration above a predefined threshold) in an engine with internal EGR is detected or during a change of the amount of residual gas in the cylinder 100. Further, the switching period may be detected differently compared to step S101, e.g. based on engine performance parameters or the like.

The flow chart of FIG. 7b shows a further example for a sequence of steps of the present method. Starting with a stationary operating point and a determined intake valve closing $IVC_s$ (S200), the controller 13 checks whether the pedal-value gradient $\Delta PV$ is larger than a threshold value $\Delta PV_{TH}$. If this is the case, the controller 13 determines that a transient operating mode (TOM) was detected and predicts the change in the intake valve closing timing $\Delta IVC_p$ (S201). In the next step S202, the switching of the intake valve starts. If $\Delta IVC$ is larger than a threshold value $\Delta IVC_{TH}$, the controller 13 activates water injection (S204). If $\Delta IVC$ is smaller than the threshold value $\Delta IVC_{TH}$ the water injection will not be activated by the controller (S203). As long as the actual intake valve closing angle does not reach the target intake valve closing $IVC_s + \Delta IVC_p$ the transient operating mode TOM is activated and water is injected if the predicted change of the intake valve closing $\Delta IVC_p$ was larger than the threshold $\Delta IVC_{TH}$. When the intake valve closing reaches the target value $IVC_s+\Delta IVC_p$ the controller 13 determines the end of intake valve switching (S205) by means of an optional knocking sensor (not depicted) which is electrically connected to the controller 13, whether knocking occurs or not. If knocking occurs, the controller 13 performs water injection (S207), if not, no water will be injected.

In the above example, it should be understood that some steps may be left out and/or repeated. For example, the method may only include the steps of detecting whether a transient operating mode is present and activating water injection which means that only steps S200, and S204 would be carried out. Further, the detecting of a transient operating mode may not only be carried out as described in connection with step 201 above. Instead of the pedal value or in addition thereto, other indicators for a transient operating mode may be used, such as speed or acceleration of the vehicle, engine load or engine rotational speed, and the like. For example, several checking steps may be carried out subsequently or in parallel to determine whether a transient operating mode has occurred.

Further, the steps after S205 may be left out, too. Even further, the detection of a valve closing timing switching may be carried out in a different way. For example, in S202 it may be detected by a comparison that the target valve switching timing and the present valve switching timing are different from each other which may be interpreted as the beginning of a switching period and the water injection step S204 may be started (see e.g. FIG. 7a). In the same way it may be determined without a knocking sensor whether the switching period is still active, and, as soon as the switching period is detected to end, the water injection may be stopped.

Further, instead of or in combination with the water injection during early/late intake valve closing switching as described above, the water injection step may include to detect whether an acceleration above a pre-set threshold is detected especially when the engine has an internal EGR system, and the water may be injected during the rapid acceleration. In this case, the corresponding steps of FIG. 7 (especially the steps between S201-S205) would be replaced or additional steps would be added.

The water injection may also be varied which is further described below.

The FIGS. 8a-d schematically depict different intake and exhaust valve curves to realize different strategies of trapping residual gas in the cylinder 100. FIG. 8a shows a valve timing with an early intake valve opening during the exhaust stroke which leads to a large valve overlap before gas exchange top dead center (GTDC). During this large valve overlap exhaust gas is pressed into the intake manifold, as long as the exhaust pressure is higher than the intake pressure. FIG. 8b shows a valve timing in which the exhaust valve 7 closes late during the intake stroke which leads to a large valve overlap before gas exchange top dead center (GTDC). This late exhaust valve closing causes that exhaust gas is drawn out of the exhaust port 5 back into the cylinder 100. In FIG. 8c a valve timing is depicted which shows a second opening of the exhaust valve 7 during the intake stroke, so that exhaust gas is re-aspirated into the cylinder 100. In FIG. 8d the residual gas is trapped in the cylinder 100 by an early closing of the exhaust valve 7 (e.g. 90 degrees before GTDC) and a late opening of the intake valve 6 (e.g. 90 degrees after GTDC), which causes a negative valve overlap. Whereas the valve timing depicted in FIG. 8a results in the coolest residual gas temperature, the valve timing shown in FIG. 8d leads to the hottest residual gas temperature of all shown valve timing strategies. Responsible for that are the wall heat losses of the gas in the exhaust 5 and the intake port 4, which are the highest when the exhaust gas flows back from the exhaust port 5 to the intake port 4 and the lowest when no gas flow takes place. In spark ignited gasoline engines the valve strategies schematically depicted in FIGS. 8a and 8b may be preferably used, which may result in moderate residual gas temperatures at low load. Nevertheless, using the valve overlap schematically depicted in FIG. 8b at mid load, which may be useful to reduce pumping losses, knocking may appear. Particularly in transient operating mode the risk of knocking may be present because of the delayed response behaviour of the valve actuator 10, 11. Therefore, the water injection during the transient operating mode as described is an effective measure to suppress knocking in that situation.

FIGS. 9a-d illustrate four possible examples of a water split injection during the transient operating mode. FIG. 9a shows the injection signals WI of four and two injections respectively with the same injection period. The multiple injections take place during the opening time of the intake valve IV because the examples in FIG. 9a and FIG. 9b represent a port water injection. Since in the first cycle of the transient operating mode a higher amount of water may be needed, the number of injections may be reduced from four injections in the first cycle to two injections in a subsequent cycle x. In FIG. 9b the same injection pattern as in FIG. 9a is shown for the first cycle of the transient operating mode. Instead of reducing the number of injections FIG. 9b shows four injections with a reduced injection period to decrease the total amount of injected water in a subsequent cycle x. In another aspect of the present application the injection periods in the first and in a subsequent cycle may have different length, e.g. a first long injection period followed by multiple shortened injection periods or vice versa. Furthermore, in a subsequent cycle the number of injections and the injection period may be reduced. The number of injections may vary from 1 to 5 and the injection period may be in a range of 0.5 ms to 5 ms. The previously described injection patterns may also be realized with a direct water injection DWI. Additionally, a direct water injection DWI allows for multiple water injections in the compression stroke, as shown in FIGS. 9c and 9d. Parallel to the examples shown in FIG. 9a and 9b, in FIG. 9c, the number of injections is halved in a subsequent cycle x, whereas FIG. 9d shows a reduced injection period for an equal number of injections as in the first cycle. The former described variations of the injection period and the number of injections may also be realized when the water is injected during the compression stroke. It should be noted that increasing the first water injection period, and then gradually decreasing the injection period beneficially stabilizes the water supply to the cylinder 100. Splitting the water injection into multiple injection actions during one combustion cycle, may promote the evaporation of the water which avoids adhesion to the cylinder wall 14. If the amount of water is determined in advance, the knocking suppression and the stability of the combustion can be ensured well, and, if the described feedback control of the amount of water is used in addition, it can be ensured even better. The combustion stability can be further improved if the ignition energy during the water injection according to the here described method is increased. Energy can however be saved if the ignition energy is gradually decreased from a first ignition to the subsequent ones.

It is summarized that the present subject-matter especially enables an improved suppression of knocking in internal combustion engines by water injection during transient engine operating modes. For example, a preferred aspect covers a combination of a miller cycle engine with water injection and water injection during the early or late intake valve closing switching. Further, during a rapid acceleration, the water injection is used especially when the engine has an internal EGR system.

While the above describes a particular order of operations performed by certain aspects and examples, it should be understood that such order is exemplary, as alternatives may perform the operations in a different order, combine certain operations, overlap certain operations, or the like. References in the specification to a given aspect indicate that the aspect described may include a particular feature, structure, or characteristic, but every aspect may not necessarily include the particular feature, structure, or characteristic. The features which are described herein and which are shown by the Figures may be combined. The herein described and claimed subject-matter shall also entail these combinations as long as they fall under scope of the independent claims.

It should again be noted that the description and drawings merely illustrate the principles of the proposed methods, devices and systems. It will thus be appreciated that those skilled in the art will be able to devise various arrangements that, although not explicitly described or shown herein, embody the principles of the claimed subject-matter and are included within its spirit and scope.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, it should be noted that the functions of the various elements described herein may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

Finally, it should be noted that any block diagrams herein represent conceptual views of illustrative circuitry embodying the principles of the claimed subject-matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Again summarizing, the present subject-matter/method offers an effective concept to avoid engine knocking in a transient operating mode by injecting a non-combustible fluid, which is preferably a liquid and most preferably water. The method enables high compression ratios even in charged gasoline engines without drawbacks regarding acceleration response and fuel consumption in transient driving situations.

REFERENCE SIGNS LIST 1 combustion chamber
2 piston
3 connecting rod
4 intake port
5 exhaust port
6 intake valve
7 exhaust valve
8 fuel injector
9 non-combustible fluid/water injector
10 intake valve phasing actuator
11 exhaust valve phasing actuator
12 spark ignition
12a spark plug
12b ignition coil
13 controller
14 cylinder wall
15 (water) tank
16 (water) pump
17 (water) pipe
100 cylinder
101 (water) injection device
ISFC indicated specific fuel consumption
GTDC gas exchange top dead center
ITDC ignition top dead center
BDC bottom dead center
IV intake valve
EV exhaust valve
IVA intake valve angle
EVA exhaust valve angle
IVC intake valve closing
IVL intake valve lift
WI water injection
PWI port water injection
DWI direct water injection
TOM transient operating mode

The invention claimed is:

1. A method for controlling an internal combustion engine with at least one cylinder, at least one non-combustible fluid injector configured to inject a non-combustible fluid into the internal combustion engine and at least one controller,
comprising controlling the injection device to inject the non-combustible fluid into the internal combustion engine when the internal combustion engine operates in a transient operating mode, and
detecting and/or predicting the start and the duration of the transient operating mode, and activating the injector to inject non-combustible fluid when the start of the transient operating mode is determined and/or at the predicted start of the transient operating mode.

2. The method according to claim 1, further comprising controlling a variable valve train of the internal combustion engine configured to vary a valve opening/closing timing, wherein
the variable valve train is configured to switch the intake valve closing timing from a first crank angle to a second crank angle, with the second crank angle being larger than the first crank angle; or wherein the variable valve train is configured to switch the intake valve closing timing from a third crank angle to a fourth crank angle, with the fourth crank angle being smaller than the third crank angle.

3. The method according to claim 1, further comprising controlling a variable valve train configured to vary an amount of internal residual gas from a first residual gas value to a second residual gas value, wherein the second residual gas value is larger than the first residual gas value.

4. The method according to claim 1, further comprising injecting water during a switching period during which it is switched from or to an early or late intake valve closing timing.

5. The method according to claim 1, further comprising decreasing an amount of injected non-combustible fluid from a first combustion cycle of the transient operating mode to a subsequent combustion cycle of the transient operating mode.

6. The method according to claim 1, further comprising decreasing an injection period of non-combustible fluid from the first combustion cycle of the transient operating mode to a subsequent combustion cycle of the transient operating mode.

7. The method according to claim 1, wherein the controller splits the total amount of the injected non-combustible fluid and injects it over a plurality of multiple injections.

8. The method according to claim 7, wherein the controller decreases the number of multiple injections of the non-combustible fluid from the first combustion cycle of the transient operating mode to a subsequent combustion cycle of the transient operating mode.

9. The method according to claim 7, wherein the controller decreases the injection period of each injection of the multiple in-jections of the non-combustible fluid from the first combustion cycle of the transient operating mode to a subsequent combustion cycle of the transient operating mode.

10. The method according to claim 1, further comprising increasing the ignition energy of the spark ignition from a predefined first ignition energy value to a predefined second energy value when injection of non-combustible fluid is performed.

11. The method according to claim 10, further comprising decreasing the predefined second ignition energy value of the spark ignition from the first combustion cycle of the transient operating mode combustion cycle of the transient operating mode.

12. The method according to claim 10, further comprising increasing the predefined ignition energy of the spark ignition by providing a predefined longer spark duration or by providing a predefined number of multiple spark ignitions.

13. A control device for an internal combustion engine with at least one cylinder and at least one non-combustible fluid injector configured to inject a non-combustible fluid into the internal combustion engine, wherein the control device is configured to:

control the injection device to inject the non-combustible fluid into the internal combustion engine when the internal combustion engine operates in a transient operating mode;

detect and/or predict the start and the duration of the transient operating mode; and activate the injector to inject non-combustible fluid when the start of the transient operating mode is determined and/or at the predicted start of the transient operating mode.

14. The control device of claim 13, further comprising an internal combustion engine with at least one cylinder and at least one non-combustible fluid injector configured to inject a non-combustible fluid into the internal combustion engine.

15. A non-transitory computer program product operable for implementing a method for controlling an internal combustion engine with at least one cylinder, at least one non-combustible fluid injector configured to inject a non-combustible fluid into the internal combustion engine and at least one controller, the computer program product comprising a non-transitory storage medium executable by a processor to perform the program steps of:

controlling the injection device to inject the non-combustible fluid into the internal combustion engine when the internal combustion engine operates in a transient operating mode, and detecting and/or predicting the start and the duration of the transient operating mode, and activating the injector to inject non-combustible fluid when the start of the transient operating mode is determined and/or at the predicted start of the transient operating mode.

* * * * *